United States Patent [19]

Bragin

[11] Patent Number: 4,832,605
[45] Date of Patent: May 23, 1989

[54] TEACHING AND DEMONSTRATION SYSTEM

[76] Inventor: Alexander Bragin, 1841 Central Park Ave., Apartment 8E, Yonkers, N.Y. 10710

[21] Appl. No.: 146,436

[22] Filed: Jan. 21, 1988

[51] Int. Cl.$^4$ .......................... G09B 1/08; G09B 15/02
[52] U.S. Cl. ................................... 434/168; 84/471 R
[58] Field of Search ...................... 434/168, 167, 172; 84/470, 471; 281/31, DIG. 1

[56] References Cited

U.S. PATENT DOCUMENTS

| | | | |
|---|---|---|---|
| 364,845 | 6/1887 | Oakley | 434/167 |
| 672,678 | 4/1901 | Kitching | 84/470 |
| 1,043,652 | 11/1912 | Whitman | 84/470 |
| 1,735,883 | 11/1929 | Smith | 434/167 X |
| 2,477,213 | 7/1949 | Staggs | 119/103 |
| 2,864,275 | 12/1958 | Fraleigh | 84/471 |
| 3,077,677 | 2/1963 | Malkin et al. | 434/172 |
| 3,092,400 | 6/1963 | Smith | 281/31 X |
| 3,496,653 | 12/1970 | Wolfner et al. | 434/168 |
| 3,609,877 | 10/1971 | Weinstein | 434/167 X |
| 3,715,951 | 2/1973 | Lanaro | 84/470 |
| 3,823,491 | 7/1974 | Lehmann | 434/168 |
| 4,204,343 | 5/1980 | Brooks | 434/172 |
| 4,366,637 | 1/1983 | Dechamps | 434/168 X |
| 4,629,349 | 12/1986 | Pitts | 281/31 X |
| 4,702,700 | 10/1987 | Taylor | 434/168 X |

*Primary Examiner*—William H. Grieb
*Attorney, Agent, or Firm*—S. C. Yuter

[57] ABSTRACT

A teaching and demonstration system is disclosed comprising a looseleaf notebook with a clear plastic pocket attached to the outside of its front cover. A metallic sheet is inserted into the pocket and a nonmetallic sheet is inserted between the metallic sheet and the inside surface of the pocket. The nonmetallic sheet has printed subject matter on it related to the teaching of music, spelling or reading. Magnetic elements are positioned on the outside surface of the pocket and are held there due to magnetic attraction to the metallic sheet. The magnetic elements are related to the printed subject matter. For example, if the printed subject matter represents a musical scale the magnetic elements represent musical notes. For the teaching of spelling, the subject matter consists of words with missing letters and the magnetic elements represent the missing letter. For the teaching of reading the subject matter consists of spelled words of well-known objects and the magnetic elements represent the well-known objects. A zippered clear plastic pouch is connected to the inside rings of the looseleaf notebook. The pouch has three separate sections to hold magnetic elements used to teach music, spelling and reading. The magnetic elements may be in the shape of missing letters or well-known objects. Instructional material related to the taught subject matter is also stored on the rings of the looseleaf notebook and may be separated by nonmetallic sheets representing each subject matter that are not then in use.

39 Claims, 2 Drawing Sheets

TEACHING AND DEMONSTRATION SYSTEM

BACKGROUND OF THE INVENTION

1. Field of the Invention

This invention pertains to teaching and demonstration systems and more particularly to systems for teaching and demonstrating how to learn such subjects as music, spelling and reading.

2. Description of the Related Art

A preliminary novelty search developed the following U.S. Pat. Nos.: Kitching 672,678; Whitman 1,043,652; Sledge 2,477,213; Wolfner 3,496,653; Lanaro 3,715,951, and Dechamps 4,366,637.

Lanaro discloses a music teaching aid in the form of a three-dimensional unit visually similar to the written presentation of a music score which can be physically manipulated by the music student or teacher in gamelike fashion to generate the student's interest and facilitate the music learning process. The teaching aid includes notes in the form of movable resilient (nonmagnetic) spheres simulating note members. The spheres have slots which plug onto or in between parallel wires supported by a frame simulating a musical staff as presented in written sheet music. After placement on the wires the note member spheres can be shifted laterally. Other three-dimensional members simulate the appearance of clef members, note-identifying members, measure-indicating members, sharp and flat-indicating members and musical time-indicating members.

Lanaro's members can be supplied to the child and a request made, for example, by the teacher that the child place a note at the G position on the treble clef of the staff, first, perhaps, with the treble clef-identifying member and the note-identifying member in position, and later without such indicating members in position. Thus, through the playing of a game, which allows for the child's manipulation of the three-dimensional units, his or her interest is captured and the learning process proceeds. Because of the visual similarity between the three-dimensional teaching aid and that of the written musical score, Lanoro claims that the learning process is expedited.

With respect to the music-teaching system herein claimed, Lanaro's music teaching aid is the most pertinent of the patents developed by the search.

Also pertinent to the claimed system is Dechamps' set of advertising components, which consist of very flat magnetic characters simulating printing which attach to a metal sheet.

The remaining patents are also of interest. Wolfner discloses a book in which tiles representing animal shapes have embedded bar magnets which match the correspondingly-shaped recess on a panel with oppositely polarized magnets. Kitching discloses a device for teaching music in which notes have looped holding pieces which slip over strips of a background staff. Sledge discloses a musical educational appliance in which freely movable nonmagnetic blocks slide on a horizontal surface representing a staff. Whitman discloses a device for teaching fractional values.

BRIEF SUMMARY OF THE INVENTION

A general object of the invention is to provide an improved music teaching and demonstrating system.

A more specific object of the invention to provide such a system which is less expensive than Lanaro's, much easier and more familiar to use, more fun to play with, and more comprehensive in content.

Another object of the invention is to provide an improved system for teaching spelling and reading.

A further object of the invention is to provide a multiple teaching system for the subjects of music, spelling and reading.

Still another object is to provide a multiple teaching system which is completely integrated in one unit.

Yet another object of the invention is to provide such teaching and learning systems which readily incorporate supporting and integrated learning material.

Briefly, in accordance with the invention, a a teaching and demonstration system is provided comprising a looseleaf notebook consisting of front and back covers connected together by a hinged back having openable rings for retaining matching hole-punched paper between the covers. The front cover has an overlayed clear plastic sheet substantially coextensive in area with the front cover and connected to the outer edges of the front cover on three sides to form a clear plastic pocket on the outside of the front cover. A metallic sheet substantially coextensive with but slightly smaller in area than the clear plastic pocket is positioned in the clear plastic pocket. A nonmetallic sheet substantially coextensive with but slightly smaller in area than the clear plastic pocket is positioned in the clear plastic pocket between the metallic sheet and the overlayed plastic sheet. The nonmetallic sheet has printed subject matter on the side adjacent to, and seeable through, the overlayed clear plastic sheet. A plurality of magnetic elements are adapted to be magnetically positioned on the outside of the overlayed clear plastic sheet in association with the printed subject matter on the nonmetallic sheet. The magnetic attraction between each of the plurality of magnetic elements and the metallic sheet is sufficient to maintain each of the magnetic elements in a fixed position with respect to the printed subject matter on the nonmetallic sheet until moved to another position on the overlayed clear plastic sheet.

The printed subject matter on the nonmetallic sheet may represent a musical scale, words with missing letters or spell familiar objects such as trucks and dolls. With a musical scale for the teaching of music, the magnetic elements represent musical notes and other musical elements. With words with missing letters for the teaching of spelling, the magnetic elements may simulate the missing letters. With spelled familiar objects for the teaching of reading, the magnetic elements may simulate the objects themselves.

A feature of the invention is a multiple-pocket zippered plastic pouch which is removably attached to the openable rings inside the looseleaf notebook. The pockets may separately store musical magnetic elements, spelling magnetic elements and reading magnetic elements.

Another feature of the invention is separately tabbed sections of written instruction material for teaching music, spelling and reading which are stored on the openable rings inside the looseleaf notebook.

Still another feature of the invention is the use of nonmetallic sheets with music, spelling and reading subject matter to separate the corresponding instruction sections in the looseleaf notebook.

An advantage of the invention is that the looseleaf notebook itself, as a book, is similar to books used to teach music, spelling and reading, and thus more familiar to students.

A major advantage of the invention is that it can greatly enhance and speed up the learning process for kindergarten, music school and early school children ages 3–8. For example, in music school children can move small magnets representing musical notes around the musical board overlay and learn how to identify the notes, the position of the notes on a board and at a later stage to compose melodies and musical learning games.

Also, it is well known that one of the most difficult stages in the learning process is to correlate the position of the musical notes from the music sheet to the actual (physical) location of the notes on a piano or organ; i.e., which key to push to create a proper sound. A further advantage of the invention is to allow a student to establish this correlation and memorize it faster than by traditional means. Similar advantages accrue in helping to develope spelling and math skills.

Still another advantage of the invention is as a tool for group lessons, and it speeds up the learning process as much as 50 percent.

Additional advantages of the invention are: (a) flexibility in use for different subjects; (b) it provides a game element in learning activities; (c) it can be used for child and adult multipurpose board games; (d) ease in manufacture and marketing; (e) portablity and it can be carried by small children; (f) use as a portable demonstration kit by architects, sales people, builders, graphic designers and others.

BRIEF DESCRIPTION OF THE DRAWINGS

Other objects, features and advantages of the invention will be apparent from the following Description of the Preferred Embodiment taken together with the accompanying drawings in which:

FIG. 5 is a cross-sectional view taken along the lines 5—5 of FIG. 2 showing the construction of the system.

FIG. 6 is a plan view of magnetic members used to teach spelling on which letters are adhered.

FIG. 7 is a plan view of the nonmetallic subject matter sheet used to teach music.

FIGS. 8A and 8B are plan views of magnetic members in the shape of familiar objects, an apple and a truck, used to teach reading, and FIG. 8C is a cross-sectional view taken along the lines 8C—8C of FIG. 8B of the magnetic member representing a truck.

FIG. 9 is a plan view of a nonmetallic subject matter sheet used to teach spelling and using magnetic members with adhered letters on their surfaces.

DESCRIPTION OF THE PREFERRED EMBODIMENT

Figure 1:
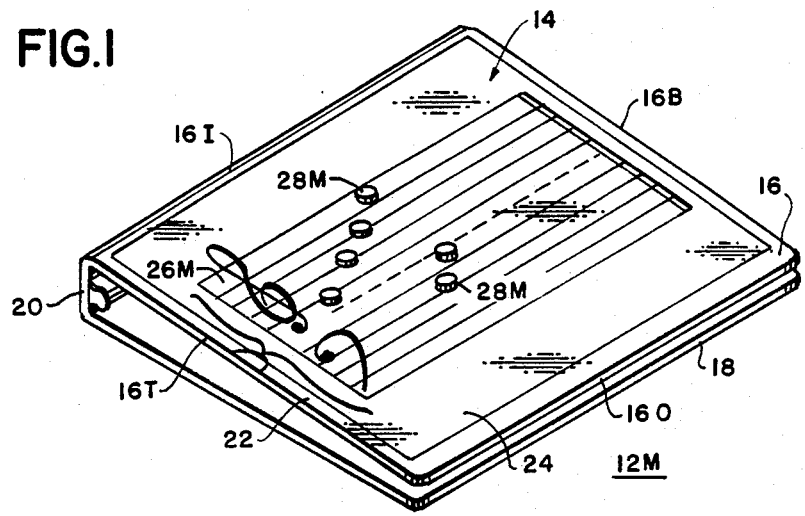
FIG. 1 is a perspective view of a teaching and demonstration system in accordance with the preferred embodiment of the invention which is used to teach music using magnetic discs to represent musical notes which magnetically adhere to the outside of the plastic cover of the looseleaf notebook.

Referring to FIG. 1 of the drawings, teaching and demonstration system 12M is shown comprising the looseleaf notebook 14 having a front cover 16 and rear cover 18 joined by the hinged back 20. Front cover 16 has four sides, the top side 16T, the bottom side 16B, the inside 16I and the outside 16O. A clear plastic sheet 22 has its outer edges adhered to the underside of the outer edges of sides 16I, 16B and 16O leaving side 16T open to form a clear plastic pocket 24 over front cover 16 which is open at the top of front cover 16. Showing through the clear plastic pocket 24 is a nonmetallic subject matter sheet 26M (also see FIG. 7) used for the teaching of music. At the outside of clear plastic pocket 24 are magnetic members 28M representing musical notes. They are made from a cast magnetized ferrite and thus adhere to the outer surface of plastic pocket 24 due to the magnetic attraction to a metallic sheet 30 (FIG. 2) inserted in clear plastic pocket 24 beneath nonmetallic sheet 26M (FIG. 1)

Figure 2:
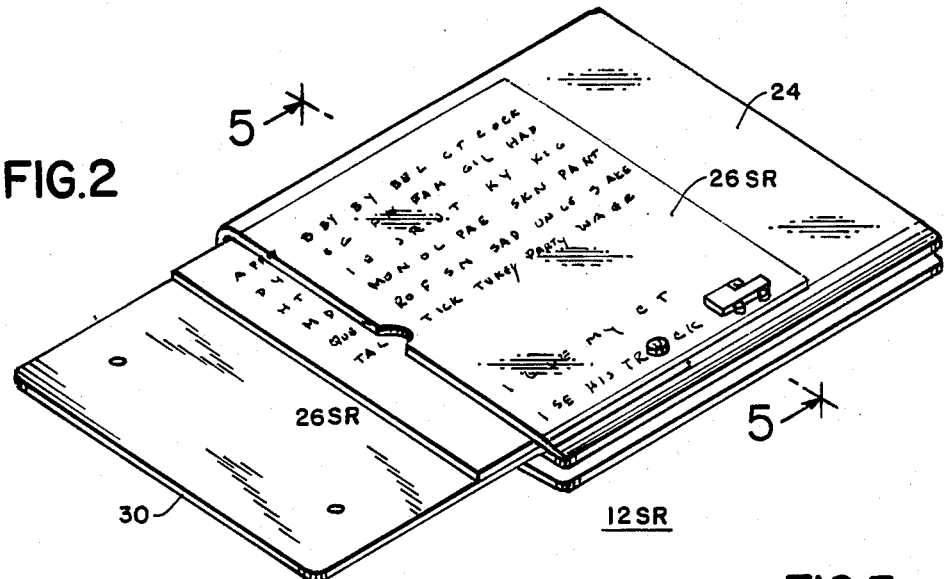
FIG. 2 is a perspective view of the preferred embodiment of the invention used to teach both spelling and reading and showing how the metallic sheet and nonmetallic subject matter sheet slide into the plastic pocket on the front cover of the looseleaf notebook.

The teaching and demonstration system 12SR shown in FIG. 2 is substantially the same as system 12M in FIG. 1 except that its nonmetallic subject matter sheet 26SR is substituted for sheet 12M. System 12SR is used to teach both spelling and reading and is shown combined for purposes of convenience. However, separate nonmetallic subject matter sheets 26S and 26R are preferred so that either spelling or reading can be taught separately.

Figure 3:
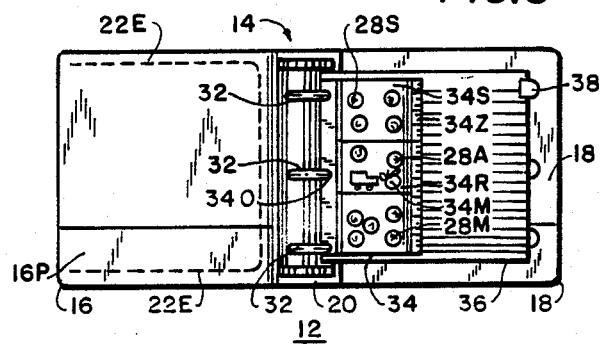
FIG. 3 is a plan view of the looseleaf notebook opened to show the multi-pocketed zippered plastic pouch which hold the magnetic members separately used to teach music, spelling and reading together with written instructional pages.
Figure 4A:
FIG. 4A is a plan view of a magnetic member used to teach music.
Figure 4B:
FIG. 4B is a cross-section of that member and FIG. 4C is a plan view of a magnetic member shaped to teach spelling.
Figure 4C:

FIG. 3 shows looseleaf notebook 14 lying open on a surface. Shown adhered along the outer edge of the inside of front cover 16 are the edges 22E of clear plastic sheet 22 which forms the clear plastic pocket 24 (FIG. 1). At the lower end of the inside of front cover 16 is a pocket 16P, with the lower end of the adhered edge 22E adhered over pocket 16P.

Mounted in hinged back 20 of looseleaf notebook 14 are three equally-spaced openable looseleaf rings 32 of the type usually employed in looseleaf notebooks. Mounted via three matching holes 340 on rings 32 is clear plastic pouch 34. Pouch 34 at its outer end has a zipper 34Z to open and close it, and is divided into three separate sections 34M, 34R and 34S. Section 34M is used to store magnetic members 28M used to teach music, section 34R is used to store magnetic members simulating objects, such as a truck and apple, used to teach reading, and section 34S is used to store magnetic members 28S used to teach spelling. Section 34R also stores magnetic members 28A used to teach arithmetic in association with a corresponding nonmetallic subject matter sheet 26A (not shown).

Also mounted on rings 32 are pages 36 of written instructional material separated by tabbed sheets 38, indexing the separate instruction sections for teaching music, spelling and reading. Preceding those tabbed sections which are not currently selected for teaching are the nonmetallic subject matter sheets 26 (not shown) which are not inserted into pocket 24 (FIG. 1). FIG. 5 shows the separate cross sections of teaching and demonstration system 12 with the clear plastic pouch 34 and instructional pages 36.

A separate nonmetallic subject matter sheet 26SR is shown in FIG. 9. Various words are written but with missing letters. In teaching spelling the student is encouraged to fill out the incomplete words with a missing letter using the magnetic members 28S (FIG. 6).

A separate subject matter sheet 26R to teach reading is not shown. But in use for that purpose, words spelling out such objects as an apple or a truck are covered by magnetic members 28R (FIG. 8) representing those objects. Each magnetic member 28R is in the shape of the represented object and has an adhered picture 28P (FIG. 8C) of the same object on its top surface Alternatively, magnetic members 28R can be in the shape of discs with a picture of the object adhered to its surface. They are constructed from printing the objects on pressure-sensitive labels, punching them out in circular form and adhering them to a magnetic ferrite disc.

Referring to FIGS. 1 and 7, showing the teaching and demonstration system 12M for the teaching of music, while the magnetic members 28M are shown as discs, they too can have adhered labels representing not only notes but other musical elements such as measure indicating members and sharp and flat notes.

Thus, in accordance with the invention, a teaching and demonstration system has been provided accomplishing all of the objects, and having the features and advantages specified at the beginning of this specification.

What is claimed is:

1. A teaching or demonstration system comprising:
    A. a looseleaf notebook consisting of front and back covers connected together by a hinged back having openable rings for retaining matching hole-punched paper between said covers;
    B. said front cover having an overlayed clear plastic sheet substantially coextensive in area with said front cover and connected to the outer edges of said front cover on three sides to form a clear plastic pocket on the outside of said front cover;
    C. a metallic sheet substantially coextensive with but slightly smaller in area than said clear plastic pocket positioned in said clear plastic pocket;
    D. a nonmetallic sheet substantially coextensive with but slightly smaller in area than said clear plastic pocket positioned in said clear plastic pocket between said metallic sheet and said overlayed plastic sheet, said nonmetallic sheet having printed subject matter on the side adjacent said overlayed clear plastic sheet; and
    E. a plurality of magnetic elements adapted to be magnetically positioned on the outside of said overlayed clear plastic sheet in association with said printed subject matter on said nonmetallic sheet;
    F. whereby the magnetic attraction between each of said plurality of magnetic elements and said metallic sheet is sufficient to maintain each of said magnetic elements in a fixed position with respect to said printed subject matter on said nonmetallic sheet until moved to another position on said overlayed clear plastic sheet.

2. The teaching or demonstration system of claim 1 wherein said subject matter printed on said nonmetallic sheet is a musical scale and said plurality of magnetic elements simulate musical notes.

3. The teaching or demonstration system of claim 1 wherein said subject matter printed on said nonmetallic sheet is a plurality of words having missing letters and said plurality of magnetic elements simulate said missing letters.

4. The teaching and demonstration system of claim 3 wherein each of said magnetic elements is in the shape of a missing letter.

5. The teaching and demonstration system of claim 3 wherein each of said magnetic elements is a disc on which is adhered a missing letter.

6. The teaching or demonstration system of claim 1 wherein said subject matter printed on said nonmetallic sheet is a plurality of words spelling well-known objects and said plurality of magnetic elements simulate said well-known objects.

7. The teaching and demonstration system of claim 6 wherein each of said magnetic elements is in the shape of a well-known object.

8. The teaching and demonstration system of claim 6 wherein each of said magnetic elements is a disc on which is adhered a picture of a well-known object.

9. The teaching and demonstration system of claim 1 further comprising printed paper sheets containing subject matter related to the printed subject matter of said nonmetallic sheet, said printed paper sheets being hole punched to correspond to the positions of and removably stored on said openable rings of said looseleaf notebook.

10. The teaching and demonstration system of claim 9 wherein said subject matter printed on said printed paper sheets relates to the teaching of music.

11. The teaching and demonstration system of claim 9 wherein said subject matter printed on said printed paper sheets relates to the teaching of spelling.

12. The teaching and demonstration system of claim 11 wherein said subject matter printed on said printed paper sheets also relates to the teaching of reading.

13. A teaching and demonstration system comprising:
    A. a looseleaf notebook consisting of front and back covers connected together by a hinged back having openable rings for retaining matching hole-punched paper between said covers;
    B. said front cover having an overlayed clear plastic sheet substantially coextensive in area with said front cover and connected to the outer edges of said front cover on three sides to form a clear plastic pocket on the outside of said front cover;
    C. a metallic sheet substantially coextensive with but slightly smaller in area than said clear plastic pocket positioned in said clear plastic pocket;
    D. a nonmetallic sheet substantially coextensive with but slightly smaller in area than said clear plastic pocket positioned in said clear plastic pocket between said metallic sheet and said overlayed plastic sheet, said nonmetallic sheet having printed subject matter on the side adjacent said overlayed clear plastic sheet;
    E. a plurality of magnetic elements adapted to be magnetically positioned on the outside of said overlayed clear plastic sheet in association with said printed subject matter on said nonmetallic sheet; and
    F. a clear plastic pouch having mounting holes which correspond to the positions of said openable rings of said looseleaf notebook, said clear plastic pouch being removably stored via said mounting holes on said openable rings;
    G. whereby the magnetic attraction between each of said plurality of magnetic elements and said metallic sheet is sufficient to maintain each of said magnetic elements in a fixed position with respect to said printed subject matter on said nonmetallic sheet until moved to another position on said overlayed clear plastic sheet.

14. The teaching and demonstration system of claim 13 wherein said clear plastic pouch is adapted to store said magnetic elements.

15. The teaching and demonstration system of claim 13 wherein said clear plastic pouch has one pocket adapted to store said magnetic elements and a separate pocket adapted to store additional objects.

16. The teaching and demonstration system of claim 13 wherein said nonmetallic sheet is a first nonmetallic sheet and is hole punched to correspond to the positions of said openable rings of said looseleaf notebook and further comprising a second nonmetallic sheet with subject matter different from the subject matter of said first nonmetallic sheet which is also hole punched to correspond to the positions of said openable rings and is removably stored on said openable rings.

17. The teaching and demonstration system of claim 16 wherein said clear plastic pouch has one pocket adapted to store said magnetic elements related to the subject matter of said first nonmetallic sheet and a separate pocket adapted to store other magnetic elements related to the subject matter of said second nonmetallic sheet.

18. The teaching and demonstration system of claim 16 further comprising a third nonmetallic sheet with subject matter different from the subject matter of said first and second nonmetallic sheets which is also hole punched to correspond to the positions of said openable rings and is removably stored on said openable rings.

19. The teaching and demonstration system of claim 18 further comprising a third separate pocket in said clear plastic pouch adapted to store magnetic elements related to the subject matter of said third nonmetallic sheet.

20. A teaching and demonstration system comprising:
A. a looseleaf notebook consisting of front and back covers connected together by a hinged back having openable rings for retaining matching hole-punched paper between said covers;
B. said front cover having an overlayed clear plastic sheet substantially coextensive in area with said front cover and connected to the outer edges of said front cover on three sides to form a clear plastic pocket on the outside of said front cover;
C. a metallic sheet substantially coextensive with but slightly smaller in area than said clear plastic pocket positioned in said clear plastic pocket;
D. a first nonmetallic sheet substantially coextensive with but slightly smaller in area than said clear plastic pocket positioned in said clear plastic pocket between said metallic sheet and said overlayed plastic sheet, said first nonmetallic sheet having printed subject matter on the side adjacent said overlayed clear plastic sheet;
E. a plurality of magnetic elements adapted to be magnetically positioned on the outside of said overlayed clear plastic sheet in association with said printed subject matter on said first nonmetallic sheet;
F. whereby the magnetic attraction between each of said plurality of magnetic elements and said metallic sheet is sufficient to maintain each of said magnetic elements in a fixed position with respect to said printed subject matter on said first nonmetallic sheet until moved to another position on said overlayed clear plastic sheet;
G. said first nonmetallic sheet being hole punched to correspond to the positions of said openable rings of said looseleaf notebook; and
H. a second nonmetallic sheet with subject matter different from the subject matter of said first nonmetallic sheet which is also hole punched to correspond to the positions of said openable rings and is removably stored on said openable rings.

21. A teaching and demonstration system comprising:
A. a looseleaf notebook consisting of front and back covers connected together by a hinged back having openable rings for retaining matching hole-punched paper between said covers;
B. said front cover having an overlayed clear plastic sheet substantially coextensive in area with said front cover and connected to the outer edges of said front cover on three sides to form a clear plastic pocket on the outside of said front cover;
C. a metallic sheet substantially coextensive with but slightly smaller in area than said clear plastic pocket positioned in said clear plastic pocket;
D. a nonmetallic sheet substantially coextensive with but slightly smaller in area than said clear plastic pocket positioned in said clear plastic pocket between said metallic sheet and said overlayed plastic sheet, said nonmetallic sheet having printed subject matter on the side adjacent said overlayed clear plastic sheet;
E. a plurality of magnetic elements adapted to be magnetically positioned on the outside of said overlayed clear plastic sheet in association with said printed subject matter on said nonmetallic sheet;
F. whereby the magnetic attraction between each of said plurality of magnetic elements and said metallic sheet is sufficient to maintain each of said magnetic elements in a fixed position with respect to said printed subject matter on said nonmetallic sheet until moved to another position on said overlayed clear plastic sheet;
G. printed paper sheets containing subject matter related to the printed subject matter of said nonmetallic sheet, said printed paper sheets being hole punched to correspond to the positions of and removably stored on said openable rings of said looseleaf notebook;
H. said subject matter printed on said printed paper sheets relating to the teaching of spelling and reading; and
I. a clear plastic pouch having mounting holes which correspond to the positions of said openable rings of said looseleaf notebook, said clear plastic pouch being removably stored via said mounting holes on said openable rings.

22. The teaching and demonstration system of claim 21 wherein said clear plastic pouch is adapted to store magnetic elements representing letters.

23. The teaching and demonstration system of claim 22 wherein said clear plastic pouch has one pocket adapted to store said magnetic elements simulating letters and a separate pocket adapted to store magnetic elements simulating well-known objects.

24. A teaching or demonstration system comprising:
A. a book consisting of front and back covers connected together by a hinged back;
B. said front cover having an overlayed clear plastic sheet substantially coextensive in area with said front cover and connected to the outer edges of said front cover on three sides to form a clear plastic pocket on the outside of said front cover;
C. a metallic sheet substantially coextensive with but slightly smaller in area than said clear plastic pocket positioned in said clear plastic pocket;
D. A nonmetallic sheet substantially coextensive with but slightly smaller in area than said clear plastic pocket positioned in said clear plastic pocket between said metallic sheet and said overlayed plastic sheet, said nonmetallic sheet having written subject matter on the side adjacent said overlayed clear plastic sheet; and
E. a plurality of magnetic elements adapted to be magnetically positioned on the outside of said overlayed clear plastic sheet in association with said written subject matter on said nonmetallic sheet;
F. whereby the magnetic attraction between each of said plurality of magnetic elements and said metallic sheet is sufficient to maintain each of said magnetic elements in a fixed position with respect to said written subject matter on said nonmetallic sheet until moved to another position on said overlayed clear plastic sheet.

25. The teaching or demonstration system of claim 24 wherein said subject matter written on said nonmetallic sheet is a musical scale and said plurality of magnetic elements simulate musical notes.

26. The teaching or demonstration system of claim 24 wherein said subject matter written on said nonmetallic sheet is a plurality of words having missing letters and said plurality of magnetic elements simulate said missing letters.

27. The teaching or demonstration system of claim 26 wherein each of said magnetic elements is in the shape of a missing letter.

28. The teaching or demonstration system of claim 26 wherein each of said magnetic elements is a disc on which is adhered a missing letter.

29. The teaching or demonstration system of claim 24 wherein said subject matter written on said nonmetallic sheet is a plurality of words spelling well-known objects and said plurality of magnetic elements simulate said well-known objects.

30. The teaching or demonstration system of claim 29 wherein each of said magnetic elements is in the shape of a well-known object.

31. The teaching or demonstration system of claim 29 wherein each of said magnetic elements is a disc on which is adhered a picture of a well-known object.

32. The teaching or demonstration system of claim 24 further comprising a clear plastic pouch connected to the inside of said hinged back of said book.

33. The teaching or demonstration system of claim 32 wherein said clear plastic pouch is adapted to store said magnetic elements.

34. The teaching or demonstration system of claim 32 wherein said clear plastic pouch has one pocket adapted to store said magnetic elements and a separate pocket adapted to store additional objects.

35. The teaching or demonstration system of claim 32 further comprising printed paper sheets containing subject matter related to the printed subject matter of said nonmetallic sheet, said printed paper sheets also being connected to the inside of said hinged back of said book.

36. The teaching or demonstration system of claim 35 wherein said clear plastic pouch has a plurality of pockets.

37. The teaching or demonstration system of claim 36 wherein said clear plastic pouch is adapted to store said magnetic elements.

38. The teaching or demonstration system of claim 36 wherein said clear plastic pouch has one pocket adapted to store said magnetic elements and a separate pocket adapted to store additional objects.

39. The teaching or demonstration system of claim 24 further comprising printed paper sheets containing subject matter related to the printed subject matter of said nonmetallic sheet, said printed paper sheets being connected to the inside of said hinged back of said book.

* * * * *